United States Patent
Snyder et al.

(10) Patent No.: US 10,726,492 B2
(45) Date of Patent: Jul. 28, 2020

(54) CUSTOMIZED PLATFORM FOR HOST PROTECTION IN HOME SHARING

(71) Applicant: Allstate Insurance Company, Northbrook, IL (US)

(72) Inventors: Jennifer L. Snyder, Northbrook, IL (US); Christy Hradek, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 588 days.

(21) Appl. No.: 15/237,197

(22) Filed: Aug. 15, 2016

(65) Prior Publication Data

US 2018/0047106 A1 Feb. 15, 2018

(51) Int. Cl.
   *G06Q 40/08* (2012.01)
   *G06Q 30/06* (2012.01)

(52) U.S. Cl.
   CPC ......... *G06Q 40/08* (2013.01); *G06Q 30/0645* (2013.01)

(58) Field of Classification Search
   CPC ........ G06Q 10/00; G06Q 20/00; G06Q 30/00; G06Q 40/00
   USPC ...................................................... 705/3–44
   See application file for complete search history.

(56) References Cited

U.S. PATENT DOCUMENTS

| | | | |
|---|---|---|---|
| 7,809,587 B2 * | 10/2010 | Dorai | G06Q 40/08 703/6 |
| 8,510,196 B1 * | 8/2013 | Brandmaier | G06Q 40/08 705/35 |
| 8,650,048 B1 | 2/2014 | Hopkins, III et al. | |
| 9,811,862 B1 * | 11/2017 | Allen | G06Q 40/08 |
| 2005/0144018 A9 * | 6/2005 | Aptekar | G06Q 10/08 705/307 |
| 2005/0251427 A1 * | 11/2005 | Dorai | G06Q 10/10 705/4 |
| 2006/0004612 A1 * | 1/2006 | Chewning | G06Q 10/10 705/4 |
| 2009/0265193 A1 * | 10/2009 | Collins | G06Q 30/0185 705/4 |

(Continued)

OTHER PUBLICATIONS

Miriam Cross, "Share your Home for Fin and Profit", Kiplinger's Personal Finance, May (Year: 2016).*

(Continued)

*Primary Examiner* — Frantzy Poinvil
(74) *Attorney, Agent, or Firm* — Banner & Witcoff, Ltd.

(57) ABSTRACT

An insurance system for home sharing may comprise a mobile device of a homeowner, one or more databases storing insurance factor data, a plurality of sensors configured to monitor one or more home features, and a server comprising one or more processors and memory. The server may be configured to receive, from the mobile device, data indicating that the homeowner is renting out a home, determine a value for frequency of rentals for the home based on the data indicating that the homeowner is renting out the home, and receive, from the plurality of sensors, monitored data for the one or more home features. The server may compute an insurance premium for the homeowner based on the value for frequency of rentals for the home, the monitored data for the one or more home features, and the insurance factor data and transmit the insurance premium to the mobile device.

20 Claims, 4 Drawing Sheets

(56) References Cited

U.S. PATENT DOCUMENTS

| | | | |
|---|---|---|---|
| 2009/0279734 A1 | 11/2009 | Brown | |
| 2012/0290333 A1* | 11/2012 | Birchall | G06Q 10/087 |
| | | | 705/4 |
| 2013/0297353 A1* | 11/2013 | Strange | G06Q 40/08 |
| | | | 705/4 |
| 2014/0100889 A1* | 4/2014 | Tofte | G06Q 40/08 |
| | | | 705/4 |
| 2014/0132409 A1 | 5/2014 | Billman et al. | |
| 2014/0136242 A1 | 5/2014 | Weekes et al. | |
| 2014/0195275 A1* | 7/2014 | Pershing | G06Q 10/06 |
| | | | 705/4 |
| 2014/0257862 A1 | 9/2014 | Billman et al. | |
| 2014/0358592 A1 | 12/2014 | Wedig et al. | |
| 2015/0039466 A1* | 2/2015 | Skinner | G06Q 30/0609 |
| | | | 705/26.35 |
| 2018/0047106 A1* | 2/2018 | Snyder | G06Q 40/08 |
| 2018/0260886 A1* | 9/2018 | Buttolo | G06Q 30/0645 |
| 2018/0268473 A1* | 9/2018 | Um | G06Q 30/02 |

OTHER PUBLICATIONS

Phil Gusman, "Renter's Game", Coverage Opportunities Abound As More Rental Units are Going Up to Meet Demand, HomeOwner's Market Update, National Underwriter .. (Year: 2016).*

Nov. 2, 2017—(WO) International Search Report—PCT/US17/046702.

Nov. 25, 2019—(EP) Extended Search Report—Application No. 17841922.2.

* cited by examiner

CUSTOMIZED PLATFORM FOR HOST PROTECTION IN HOME SHARING

BACKGROUND

Insurance companies or providers may offer various services to customers, including offering auto insurance, health insurance, business insurance, home insurance, and more. In particular, insurance providers may offer home insurance to homeowners to cover costs and protect homes from damage during unexpected disasters. Home insurance may allow customers to lower costs associated with repairing, replacing, or renovating one or more features of a home. For example, insurance providers may cover weather-related damage to a home, such as hail damage, tornado damage, earthquake damage, hurricane damage, and damage associated with other catastrophes.

While home insurance offered by insurance providers may cover a host of potential perils that may occur, home insurance might not typically cover damages associated with homeowners who may rent out their homes to other individuals. For example, homeowners may rent out all or a part of their homes as vacation rentals to individuals such as travelers looking for comfortable lodging during travel. In another example, homeowners may rent out all or a part of their homes to one or more individuals looking for short-term housing in a new city. By renting out their properties, homeowners may benefit by earning revenue that may be useful for other needs, such as for paying off home mortgages.

Despite the benefits of homeowners' renting out their properties, homeowners may be liable for any damages incurred by short-term renters during the rental period. For example, homeowners may be victim to theft, damages to personal property, or loss in funds due to cancellation by renters. Conventional insurance systems might not account for such renter-related perils, resulting in losses for homeowners.

As such, new systems, methods, and devices may be desired to assist in enhancing various processes for insurance providers in order to provide adequate and accurate insurance coverage for homeowners renting out their homes.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for a customized platform for protecting homeowners participating in home sharing. The systems and arrangements disclosed herein may allow insurance providers to protect and enhance insurance coverage options for homeowners renting out their homes to individuals with little or no additional risk of personal financial loss or out-of-pocket costs resulting from renter damages.

The disclosure describes a system comprising a mobile device of a homeowner, one or more databases storing data regarding insurance factors for the homeowner, a plurality of sensors configured to monitor one or more features of a home, a network, and a server, comprising hardware including one or more processors and memory. The server may be configured to receive, from the mobile device and over the network, data indicating that the homeowner is renting out the home to one or more individuals, determine, by the one or more processors, a value for frequency of rentals for the home based on the data indicating that the homeowner is renting out the home, receive, from the plurality of sensors and over the network, monitored data for the one or more features of home, compute, by the one or more processors, an insurance premium for the homeowner based on the value for frequency of rentals for the home, the monitored data for the one or more features of the home, and the data regarding the insurance factors for the homeowner, and transmit the insurance premium for the homeowner to the mobile device.

The system may also further comprise a first computing device and a second computing device each configured to capture a first plurality of photos and a second plurality of photos, respectively, of the one or more features of the home, in which the server may further be configured to receive, from the first computing device, the first plurality of photos of the one or more features of the home, store the first plurality of photos of the one or more features of the home in the memory, receive, from the second computing device, the second plurality of photos of the one or more features of the home after a rental period has occurred, wherein the first plurality of photos and the second plurality of photos are different, compare, by the one or more processors, the first plurality of photos stored in the memory with the second plurality of photos to identify damages to the one or more features of the home, initiate, by the one or more processors, an insurance claim for the identified damages to the one or more features of the home, compute, by the one or more processors, an amount for the insurance claim for the identified damages to the one or more features of the home, and transmit, by the one or more processors and to the mobile device, a notification of the amount for the insurance claim for the identified damages to the one or more features of the home.

The disclosure also describes an apparatus comprising at least one processor, a network interface configured to communicate, via a network, with one or more computing devices, and a memory storing computer-readable instructions that, when executed by the at least one processor, cause the apparatus to receive, from a mobile device of a homeowner, data indicating that the homeowner is renting out the home to one or more individuals, determine, by the one or more computing devices, a value of frequency of rentals for the home based on the data indicating that the homeowner is renting out the home, receive monitored data for one or more features of the home from a plurality of sensors in the home, compute, by the one or more computing devices, an insurance premium for the homeowner based on the value for frequency of rentals for the home, the monitored data for the one or more features of the home, and data regarding insurance factors for the homeowner, and transmit the insurance premium for the homeowner to the mobile device.

In addition, aspects of this disclosure provide a method that includes receiving, from a mobile device and over a network, data indicating that the homeowner is renting out the home to one or more individuals, determining, by one or more computing devices, a value for frequency of rentals for the home based on the data indicating that the homeowner is renting out the home, receiving, from a plurality of sensors in the home, monitored data for one or more features of the home, wherein the one or more features of the home comprise insured items of the home and represent personal property of the homeowner, computing, by the one or more computing devices, an insurance premium for the homeowner based on the value for frequency of rentals for the home, the monitored data for the one or more features of the home, and data regarding insurance factors for the homeowner, and transmitting, by the one or more computing devices, the insurance premium for the homeowner to the mobile device.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

In accordance with various aspects of the disclosure, computerized methods, systems, devices, and apparatuses are disclosed that provide a customized computing platform for protecting homeowners participating in home sharing. As described herein, "home sharing" may refer to a homeowner renting out or "sharing" his or her home with an individual or a group of individuals for a period of time. Homeowners may rent out their homes for any period of time, including short-term and long-term rentals. For example, a rental period may be for one or two days, five days, a week, two weeks, a month, half a year, or any other predetermined period of time. In some cases, homeowners may be referred to as hosts who offer their properties to renters looking for affordable housing.

Homeowners who rent out their properties to others may often leave their belongings, such as clothes, furniture, housewares, and the like, in the home while the property is being rented. In such cases, these items that belong to the homeowner, as well as the structure itself, may be susceptible to damage by renters staying at the home during a rental period. In some embodiments, these items of the home may be referred to as one or more features of the home or personal property of the homeowner. For example, personal property may include items such as clothes, jewelry, lawn mowers, sports equipment, cameras, televisions, laptops, and the like.

In particular, the present disclosure teaches a customized insurance system that may be beneficial for homeowners in that the system may determine insurance premiums and/or insurance deductibles for providing coverage to homeowners for renter-related damages to personal property and insured items of the homeowner based on the frequency of rentals for a home, monitored data obtained from connected home sensors in the home, and data regarding insurance factors for the homeowner. The customized insurance system described herein may be integrated across a plurality of platforms and may be employed by, for instance, an insurance company that offers home insurance and home sharing benefits or services to homeowners (e.g., insurance policy holders). In some cases, the features or benefits described herein may be purchased by the homeowner as a rider (e.g., an unscheduled rider) in addition to a home insurance policy provided by the insurance company. In other words, the insurance company may offer home sharing insurance benefits or services to homeowners who are insurance policy holders with registered accounts, in which the homeowners may have purchased a rider and opted in for the home sharing insurance service or program.

In some embodiments, the customized insurance system may determine insurance premiums for a homeowner based on data collected from a plurality of connected home sensors in a home. For example, one or more sensors associated with one or more home devices, such as appliances, home systems, and the like, may monitor home devices and collect data including metrics, levels, and/or values indicating performance and quality of the one or more features of the home, in which the one or more features may include insured items of the home and represent personal property of the homeowner. The one or more sensors may include at least one of motion sensors, water heater sensors, power sensors, moisture sensors, temperature sensors, window sensors, sump pump sensors, heat or smoke sensing devices, and presence sensors. In some cases, the connected home sensors may collect data in real-time or near real-time. Additionally or alternatively, the monitored data may be collected and/or transmitted to the insurance system in batches. The monitored data from the plurality of connected home sensors may indicate whether devices in the home are operating within an expected range or, if it is outside of an expected range or threshold, whether damage has occurred to one or more devices. Based on changes and trends in the monitored data from the home sensors, the customized insurance system may determine pricing for insurance premiums for homeowners renting out their homes.

The system may also incorporate traditional insurance factors for the insurance premium calculation, in which the insurance factors may include data regarding age, gender and number of years the homeowner has owned the home, credit history, condition, materials and age of the home, location of the home, and the like. Additionally, the customized insurance system may determine insurance premiums for a homeowner based on the frequency of rentals for a home. The system may determine a value for the frequency of rentals for a home based on receiving data indicating that a homeowner is renting out his or her home. For example, the homeowner may obtain documentation, such as at least one of a booking confirmation, a rental contract, or a receipt indicating that one or more individuals are renting the home. The homeowner may upload the documentation to the insurance system by using a computing device and/or a mobile device, in which the documentation may be in the form of an email, text message, multimedia message, scanned document, photograph, or the like. Ultimately, the system may collect documentation from a computing device associated with the homeowner each time the home is rented out over a period of time, and based on this documentation, the system may determine a value for the frequency of rentals by calculating the number of rentals for the home on a weekly, monthly, or yearly basis.

In addition to calculating insurance premiums for home sharing coverage, the customized insurance system may also assess any damage to one or more items in the homeowner's home and handle insurance claims for renter-related damages in the home. In some cases, the customized insurance system may be integrated with a plurality of databases configured to store data regarding the one or more features of the home. As described herein, the plurality of databases may be referred to as a "digital repository" storing data and/or images of insured items belonging to insurance customers (e.g., homeowners). The digital repository may comprise an inventory of insured items corresponding to each insurance customer and may include photographs, receipts, and pricing for each insured item. In some embodiments, a homeowner may capture one or more photos of items in his or her home with a camera (e.g., a camera on a mobile device) prior to renting out the home to one or more individuals, and the one or more photos may be transmitted to a digital repository and stored therein.

After renting out the home, the homeowner may employ a cleaning service to clean and maintain the property for future rentals. In order to assess damages, one or more new photos of the items in the home may be captured by the homeowner or by employees of the cleaning service using a camera, such as a camera on a mobile device. The mobile device may transmit the one or more new photos of the items to the customized insurance system, and the insurance system may compare the one or more new photos of the items obtained after the rental period with the one or more photos of the items obtained from the digital repository. For example, the insurance system may utilize the photos stored in the digital repository as a baseline for determining any damages to the homeowner's items. Furthermore, the insurance system may utilize digital image processing algorithms and image analysis algorithms to detect differences between the photos depicting the items and to identify any damages. Upon identifying any damages to the one or more items of the home, the insurance system may initiate an insurance claim for the identified damages to the one or more items of the home, compute an amount corresponding to the insurance claim, and transmit a notification regarding the amount for the insurance claim for the identified damages to the one or more items in the homeowner's home.

Ultimately, the customized home insurance system described herein may provide benefits to homeowners, including enhanced insurance coverage and protection for renter-related damages, as well as improvements in identifying damages in an efficient manner by utilizing the features of a digital repository.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

Figure 1:
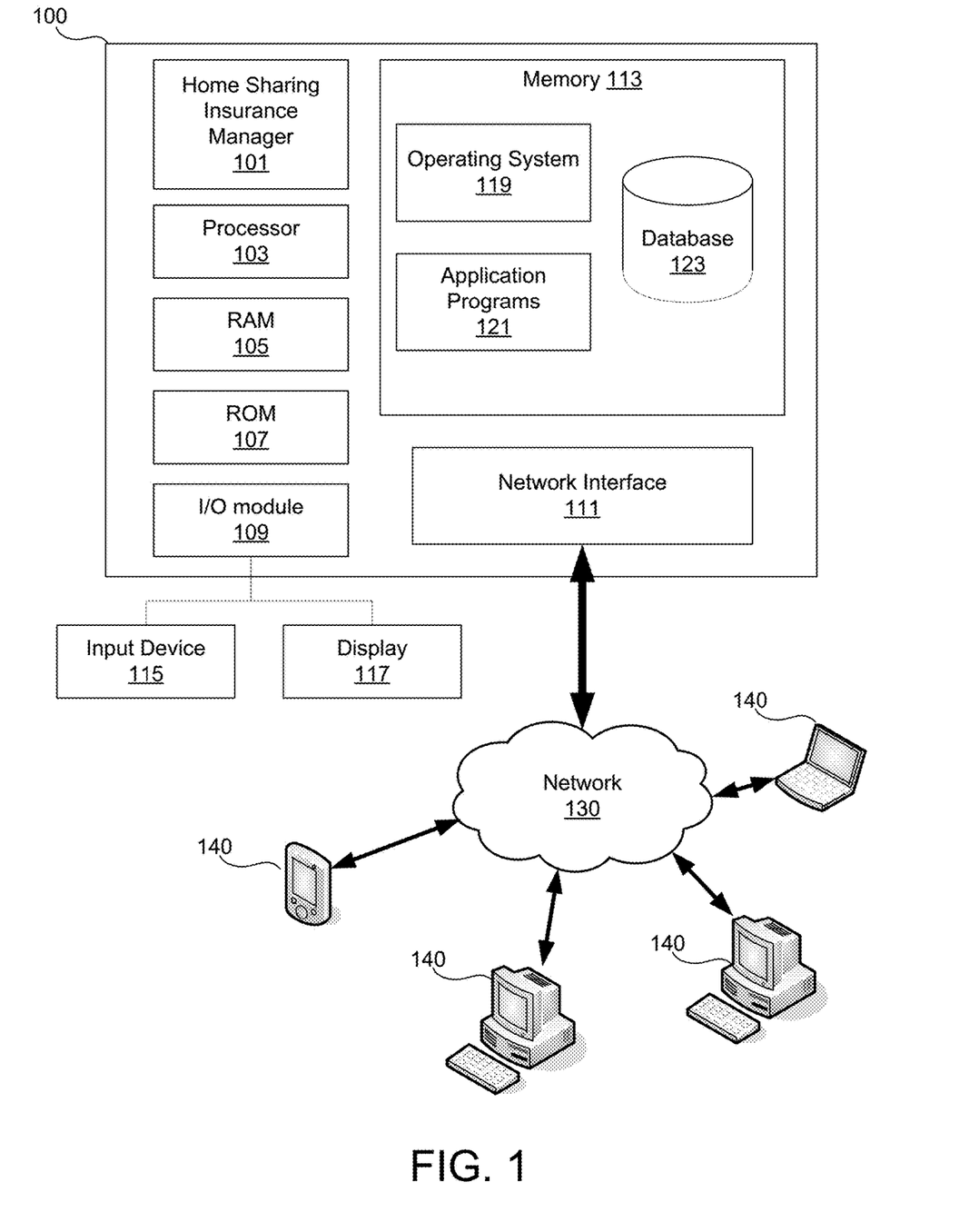
FIG. 1 depicts a block diagram of an example home sharing insurance device that may be used in accordance with one or more example embodiments.

In one or more arrangements, teachings of the present disclosure may be implemented with a computing device. FIG. 1 illustrates a block diagram of an example home sharing insurance device 100 that may be used in accordance with aspects of the present disclosure. The home sharing insurance device 100 may be a specialized computing device programmed and/or configured to perform and carry out aspects associated with determining pricing for insuring properties while being rented out to one or more individuals by homeowners and/or for identifying any damages to personal property of the homeowners as described herein. The home sharing insurance device 100 may have a home sharing insurance manager 101 configured to perform methods and execute instructions as described herein. The home sharing insurance manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the home sharing insurance manager 101 may refer to the software (e.g., a computer program or application) and/or hardware used to receive data indicating that a homeowner is renting out a home to one or more individuals, determine a value for frequency of rentals for the home based on the data indicating that the homeowner is renting out the home, receive monitored data for one or more features of the home from a plurality of connected home sensors, compute an insurance premium for the homeowner based on the value for frequency of rentals for the home, the monitored data for the one or more features of the home, and data regarding insurance factors for the homeowner, and transmit the insurance premium for the homeowner to a mobile device of the homeowner. Furthermore, the home sharing insurance manager 101 may include software and/or hardware used to receive a plurality of photos of the one or more features of a home, store the plurality of photos in one or more databases, compare photos before and after rental periods have occurred to identify damages to one or more features in the home, initiate an insurance claims for identified damages, compute an amount for the insurance claim for identified damages, and transmit notifications for the insurance claim and the amount to a mobile device of the homeowner. Specifically, the home sharing insurance manager 101 may be a part of a home insurance system that determines insurance premiums for covering a homeowner's home while being rented, identifies damages to one or more features in the home, initiates insurance claims for damages, and/or computes amounts for insurance claims.

The one or more specially configured processors of the home sharing insurance manager 101 may operate in addition to or in conjunction with another processor 103 of the home sharing insurance device 100. In some examples, the home sharing insurance manager 101 may be a device including hardware and/or software configured to perform various functions. In some embodiments, the home sharing insurance manager 101 may be a software module executed by one or more processors 103. Both the home sharing insurance manager 101 and the processor 103 may be capable of controlling operations of the home sharing insurance device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or insured individual associated with the home sharing insurance device 100 may provide input data. The I/O module 109 may be configured to be connected to a display device 117, such as a monitor, television, touchscreen, and the like, and may include a graphics card. The display device 117 and input device 115 are shown as separate elements from the home sharing insurance device 100, however, they may be within the same structure.

Using the input device 115, system administrators may update various aspects of the home sharing insurance system, such as rules or information related to identifying when homeowners are renting out their homes, determining frequency of rentals for homeowners, determining insurance premiums and/or deductibles for homeowners, comparing photos of insured items to identify damages, initiating insurance claims, and computing amounts for insurance claims for identified damages to one or more insured items of homes. For example, system administrators may update predefined rules and predefined threshold values for pricing deductibles and insurance premiums and identifying damages to insured items. In some cases, system administrators may update values of one or more metrics associated with home insurance claim processing rules using the input device 115 to update rules or information related to the home sharing insurance system, such as rules for pricing deductibles for home sharing insurance, predetermined levels or thresholds for assessing damage, and the like. In other embodiments, the home sharing insurance system may be configured to automatically update rules for determining frequency of rentals for homes and identifying monitored data for one or more features of a home, in which the one or more features may include insured items in the home and personal property of the homeowner.

On some home sharing insurance devices 100, the input device 115 may be operated by users (e.g., homeowners insured by an insurance company) to interact with the home sharing insurance platform, including submitting images, information and/or documentation (e.g., receipts, booking confirmations, rental contracts, emails, text messages, multimedia messages, scanned documents, photographs, or the like) regarding renting their home to one or more individuals, receiving and/or providing information regarding insurance premiums/deductibles, insurance claims, amounts for insurance claims, settlements, contact information, and the like, as described herein.

The memory 113 may be any computer readable medium for storing computer executable instructions (e.g., software). The instructions stored within memory 113 may enable the home sharing insurance device 100 to perform various functions. For example, memory 113 may store software used by the home sharing insurance device 100, such as an operating system 119 and application programs 121, and may include an associated database 123.

The network interface 111 allows the home sharing insurance device 100 to connect to and communicate with a network 130. The network 130 may be any type of network, including a local area network (LAN) and/or a wide area network (WAN), such as the Internet. Through the network 130, the home sharing insurance device 100 may communicate with one or more computing devices 140, such as laptops, notebooks, smartphones, personal computers, servers, and the like. The computing devices 140 may include at least some of the same components as home sharing insurance device 100. In some embodiments the home sharing insurance device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface 111 may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a home sharing insurance device 100. In other embodiments, the home sharing insurance device 100 may include fewer or more elements. For example, the home sharing insurance device 100 may use the processor(s) 103 to perform functions of the home sharing insurance manager 101, and thus, might not include a separate processor or hardware for the home sharing insurance manager 101. Additionally, or alternatively, the home sharing insurance device 100 may be a mobile device (e.g., a smartphone, tablet, and the like) specially configured to perform or carry out aspects of services and/or processes described herein, and thus, may also include various other components, such as a battery, speaker, camera, and/or antennas (not shown).

Figure 2:
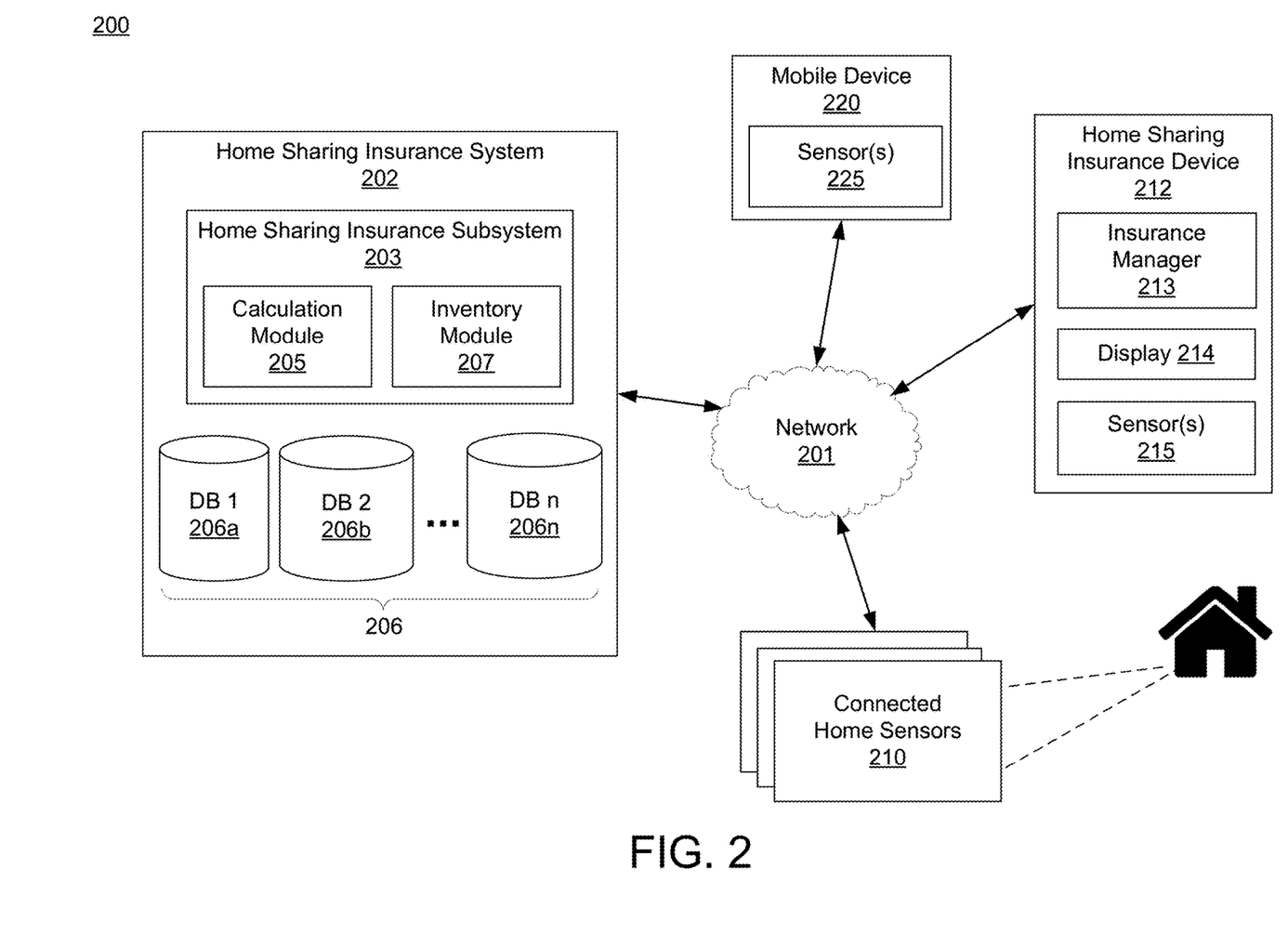
FIG. 2 depicts an example network environment in which various aspects of the present disclosure may be implemented in accordance with one or more example embodiments.

The computerized methods for determining insurance premiums for homeowners participating in home sharing, identifying damages to insured items in homes, and computing amounts for insurance claims based on damages as disclosed herein may be implemented on one or more home sharing insurance devices 100 used in various network environments. FIG. 2 illustrates an example network environment for implementing methods in accordance with aspects of the present disclosure.

As shown in FIG. 2, the network environment 200 may include a network 201 configured to connect a home sharing insurance system 202, home sharing insurance device 212, connected home sensors 210, and/or a mobile device 220. The home sharing insurance device 212 may be the same as or at least similar to the home sharing insurance device 100 described above with reference to FIG. 1. Collectively, these specialized computing devices may form at least a part of a home sharing insurance system. It is understood that there may be any number of components 210, 212, and 220 in the network environment 200. In at least some arrangements, the system may be expandable such that additional computing devices associated with other types of entities may be connected, as desired.

The network 201 may be any type of network, like the network 130 described above, and may use one or more communication protocols (e.g., protocols for the Internet (IP), Bluetooth, cellular communications, satellite communications, and the like) to connect computing devices and servers within the network environment 200 so they may send and receive communications between each other. In particular, the network 201 may include a cellular network and its components, such as cell towers.

Accordingly, for example, a mobile device 220 (e.g., a smartphone, flip-phone, tablet, and the like) or a home sharing insurance device 212 of an insured individual (e.g., a homeowner) may communicate, via a cellular backhaul of the network 201, with a home sharing insurance system 202 to transmit information regarding renting out a home to one or more individuals as part of the home sharing insurance service. For example, a homeowner may use the mobile device 220 or the home sharing insurance device 212 to submit information such as documentation in the form of an email, text message, multimedia message, scanned document, photograph, or the like to the home sharing insurance system 202 to indicate that the homeowner is renting out his or her home for a predetermined period of time. In some embodiments, the mobile device 220 or the home sharing insurance device 212 of the homeowner may communicate, via the cellular backhaul of the network 201, with the home sharing insurance system 202 to submit customer information, home information or to update account information and/or preferences for the home sharing insurance service.

In the opposite direction, the home sharing insurance system 202 may communicate, via the cellular backhaul of the network 201, with the mobile device 220 or the home sharing insurance device 212 to notify the user (e.g., the homeowner) of the mobile device 220 or the home sharing insurance device 212 of insurance premiums and/or deductibles for home sharing determined based on frequency of rentals for the home, monitored data for the one or more home features, and insurance factor data for the homeowner, as well as insurance claim information and coverage amounts. In some embodiments, the mobile device 220 and/or home sharing insurance device 212 may communicate back and forth with the home sharing insurance system 202 over the Internet, such as through a web portal.

Additionally, the home sharing insurance system 202 may further communicate with a plurality of connected home sensors 210. For example, the home depicted in FIG. 2 may include a plurality of appliances and/or systems and one or more of the appliances and/or systems (e.g., devices) may be monitored by a plurality of connected home sensors 210 (e.g., one or more sensing devices), as will be described more fully below. The plurality of connected home sensors 210 may monitor one or more features in a home and transmit monitored data to the home sharing insurance system 202 over the network 201. For example, a home may generally include a variety of systems, appliances, and the like that may be monitored by the plurality of connected home sensors 210. The plurality of connected home sensors 210 may include one or more sensors or sensing devices which may be arranged on or integrated into devices such as hot water heaters, refrigerators, washing machines, dryers, furnaces, air conditioning units, windows (e.g., to detect breakage), pipes (e.g., to detect leakage), utilities or utility meters, such as gas, water, and electric, and the like. For example, the plurality of connected home sensors 210 may include at least one of motion sensors, water heater sensors, power sensors, moisture sensors, temperature sensors, window sensors, sump pump sensors, heat or smoking sensing devices, presence sensors, float sensors, speed sensors, breakage sensors, cameras, proximity sensors, and the like.

The connected home sensors 210 may include devices for sensing temperature, sewage backup, natural gas, propane, etc., air quality (e.g., carbon monoxide, etc.), air flow quality, water flow, and the like. Additionally, the connected home sensors 210 may include one or more video monitoring devices such as security or other video cameras, live video feeds, and the like, that may receive and/or transmit video or other image data related to one or more appliances, systems, etc. In some examples, devices providing video monitoring or video feed may be monitoring the premises on a periodic or continuous basis. In some arrangements, the devices providing video monitoring or video feed may be in communication with one or more other sensing devices and may activate or begin monitoring, providing video feed, etc. upon an indication received from the one or more other sensing devices. In other examples, the plurality of connected home sensors 210 may include sensors or other monitoring devices that may be arranged on or integrated into paint, bricks or other building materials, and the like. In yet additional examples, the plurality of connected home sensors 210 may include "smart" materials, such as smart paints, smart bricks, and the like, that may provide indications of wear or potential failure.

In some arrangements, the plurality of connected home sensors 210 may be connected to or in communication with one or more home devices, such as appliances, systems, etc., to monitor one or more characteristics of the home device. For instance, home devices or systems such as a water heater, sump pump, roof, attic (e.g., air flow in attic), washing machine, dryer, refrigerator, freezer, air conditioner, furnace, windows, pipes, occupancy, and the like, may be monitored. Various other appliances and/or systems may be monitored without departing from the invention.

The plurality of connected home sensors 210 may monitor various insured items in the home, and signals from the one or more connected home sensors 210 may be transmitted to the home sharing insurance system 202. In some examples, the signals may be transmitted to the home sharing insurance system 202 over the network 201, e.g., via wired or wireless means. In some arrangements, the data may be collected in real-time and/or transmitted in real-time or near real-time. Additionally or alternatively, the data may be collected and/or transmitted in batches.

Although FIG. 2 illustrates only one home sharing insurance device 212 and one mobile device 220, the home sharing insurance system 202 may be configured to communicate with multiple home sharing insurance devices 212 and mobile devices 220 simultaneously (e.g., at or around the same time), and the multiple home sharing insurance devices 212 and mobile devices 220 may be associated with multiple individuals. For example, the home sharing insurance system 202 may receive multiple notifications simultaneously indicating that multiple homeowners are renting out their homes, determine frequency of rentals for each home of the multiple homeowners simultaneously, receive monitored data for one or more features from connected home sensors in each home simultaneously, compute insurance premiums based on respective frequency of rental values, monitored connected home sensor data, and/or insurance factor data for each homeowner simultaneously, and notify each homeowner of respective insurance premiums simultaneously.

In some embodiments, there may be one or more users or customers associated with a home. For example, a user may be associated with a home if he or she owns the home or if he or she is identified on an insurance policy that insures the home. In some embodiments, a user associated with the home may be uninsured or an insurance policy holder. A user may interact with and operate a home sharing insurance device 212 to access the home sharing insurance system 202. In some embodiments, the home sharing insurance device 212 may be a specialized mobile device (e.g., mobile phone), a tablet, laptop, personal computer, and the like configured to perform or carry out aspects associated with home sharing insurance services as described herein. For example, the home sharing insurance device 212 may be the same (e.g., integrated with, include substantially the same components and provide substantially the same functionality, or the like) as the mobile device 220 depicted in FIG. 2. The home sharing insurance device 212 may belong to a customer of an insurance provider who is enrolled in a home sharing insurance service provided by the insurance provider. In some cases, the home sharing insurance device 212 may be at an insurance provider, and data may be transmitted between the customer and the home sharing insurance device 212.

Although only one home sharing insurance device 212 is illustrated in FIG. 2, there may be any number of home sharing insurance devices 212, wherein each home sharing insurance device 212 is associated with at least one customer. The home sharing insurance device 212 may further comprise an insurance manager 213, a display 214, and sensors 215. The home sharing insurance device 212 may be configured to execute the insurance manager 213 that generates and/or displays a user interface (e.g., a graphical user interface for a website, application, software program, and the like) on the display 214. The display 214 may comprise a monitor, television, touchscreen, and the like. The user interface of the insurance manager 213 may allow users to send requests for information on home sharing, submit documentation or booking confirmations for home rentals, receive information regarding customized insurance premiums, deductibles, discounts, incentives, insurance claims, damages, compensations, settlement offers, and the like, communicate with an insurance agent, and update account information or preferences for services provided by the home sharing insurance system 202.

The insurance manager 213 may be a self-sufficient program or may be a module of another program, such as a program used to collect and/or evaluate insurance information utilized by the home sharing insurance system 202. The insurance manager 213 may have access to data that may be collected and/or stored by the home sharing insurance system 202, such as insurance information, customer information, monitored data (e.g., collected from the plurality of connected home sensors 210), and the like. For example, the insurance manager 213 may use this collected data to compute insurance premiums and/or deductibles and to provide notifications to users accordingly. In some embodiments, the insurance manager 213 may be configured in a similar manner as the home sharing insurance manager 101 or configured to perform similar functions as those performed by the home sharing insurance manager 101.

In some embodiments, the insurance manager 213 may be downloaded or otherwise installed onto the home sharing insurance device 212 using known methods. Different devices may install different versions of the insurance manager 213 depending on their platform. A user may launch the insurance manager 213 by, for example, operating buttons or a touchscreen on the home sharing insurance device 212. Additionally, or alternatively, the insurance device 212 may be configured to execute a web browser (e.g., an application for accessing and navigating the Internet) to access a web page providing an interface for the home sharing insurance system. In some embodiments, the home sharing insurance device 212 may also be configured to collect information, such as customer information. For example, the insurance manager 213 or another program installed on the home sharing insurance device 212 may instruct the home sharing insurance device 212 to collect customer data, such as a location of the customer, using the sensors 215, which may include a GPS.

The sensors 215 in the home sharing insurance device 212 may include various components, such as a GPS, camera, and the like. For example, the camera in the home sharing insurance device 212 may be utilized to capture one or more photos of insured items in a home, and the one or more photos may be utilized by the home sharing insurance system 202 to identify damages to any items in the homeowner's home after a rental period has occurred or after a predetermined time period has expired. Once the one or more images of the items have been collected, the insurance manager 213 may be configured to send the collected one or more images to the home sharing insurance system 202 instantaneously, automatically, or at a later time.

FIG. 2 also illustrates a mobile device 220 which may be any mobile device associated with a user or customer associated with a home. In particular, the mobile device 220 may belong to a customer of an insurance provider, in which the customer is enrolled in a service that allows the customer to participate in and receive home sharing insurance services. Mobile device 220 may be, for example, a smartphone or other mobile phone, personal digital assistant (PDA), tablet computer, and the like, and may include some or all of the elements described above with respect to the home sharing insurance manager 101. In some cases, the mobile device 220 may be configured similarly to the home sharing insurance device 212 and may interface or communicate with the home sharing insurance system 202 via a wireless connection (e.g., Bluetooth or other) over the network 201. The mobile device 220 may further include one or more sensors 225, such as a GPS, camera, and the like. For example, the camera in the mobile device 220 may be utilized to capture one or more photos of insured items in a home, and the one or more photos may be utilized by the home sharing insurance system 202 to identify damages to any items in the homeowner's home after a rental period has occurred or after a predetermined period of time has expired.

In additional embodiments, the mobile device 220 and/or the home sharing insurance device 212 may be utilized by one or more users who are not homeowners. For example, an insurance provider may partner with one or more cleaning services or providers to offer incentives or discounts to homeowners who are participating in home sharing and renting out their homes to others. A homeowner may hire one or more cleaning services to clean his or her home after renting out a property and to maintain his or her home for future rentals. Prior to cleaning, employees of a cleaning service may utilize the mobile device 220 and/or the home sharing insurance device 212 to capture photos of one or more items in the home using cameras on the devices (e.g., sensors 225 or sensors 215). The photos may be transmitted from the mobile device 220 and/or the home sharing insurance device 212 to the home sharing insurance system 202 in order to assess for damages to any of the items in the home.

Furthermore, the home sharing insurance system 202 may comprise a home sharing insurance subsystem 203 and a plurality of databases 206. The home sharing insurance subsystem 203 may include one or more application servers, computing devices, and other equipment (e.g., conference bridge equipment) used by entity (e.g., insurance provider) personnel to implement and provide the home sharing insurance services described herein. For example, the home sharing insurance subsystem 203 may include a calculation module 205 (e.g., which may be a part of a customized computing platform for home sharing) that is configured with programmed instructions (e.g., statistical learning algorithms, premium/deductible calculation algorithms, and the like) to determine a value for frequency of rentals for a home based on data indicating that a homeowner is renting out the home, analyze monitored data received from the plurality of connected home sensors 210 for one or more features of a home, and compute an insurance premium for a homeowner based on the value for frequency of rentals for the home, the monitored data, and insurance factor data for the homeowner. In some embodiments, the calculation module 205 may apply predefined threshold values and filters to the monitored data from the plurality of connected home sensors 210 to identify whether devices in the home are operating within an expected range or, if it is outside of an expected range or threshold, whether damage has occurred to one or more devices. The calculation module 205 may access and parse these predefined threshold values and metrics which may be stored in one or more databases (such as databases 206).

Additionally, the calculation module 205 may also utilize digital image processing algorithms and/or image analysis algorithms to detect differences between photos depicting insured items in the home and to identify any damages to insured items after the home is rented out to tenants. For example, the calculation module 205 may compare two sets of photos (e.g., one set of photos prior to rental and a second set of photos after rental) to identify damages in the second set of photos. In some embodiments, the calculation module 205 may identify one or more damaged portions in the photos in the second set and may crop or otherwise modify the photos such that only the one or more damaged portions of the photos are saved, transmitted, and/or used for processing insurance claims. By saving and/or utilizing just the portions of the photos that depict the damages, the home sharing insurance system 202 may be able to save storage space as needed for storing the photos. Furthermore, the calculation module 205 may be configured with programmed instructions to initiate insurance claims for identified damages to one or more items in a home and compute amounts for insurance claims for covering the identified damages to the one or more items. The home sharing insurance subsystem 203 may also include an inventory module 207 which may be configured with one or more rules and logic for analyzing a plurality of photos of insured items, maintaining information regarding insured items, and assessing damages to insured items.

In some embodiments, the inventory module 207 may access and maintain information stored in one or more databases 206. For example, the inventory module 207 may maintain and parse data stored in the one or more databases 206 which may include inventory information of insured items for a plurality of homeowners insured by an insurance provider. In some embodiments, the one or more databases 206 may be referred to as a "digital repository." For example, the one or more databases 206 may store photographs, receipts, and pricing for each insured item corresponding to each homeowner insured by the insurance provider.

The home sharing insurance subsystem 203 may include functionality that may be distributed among a plurality of computing devices. For example, the home sharing insurance subsystem 203 may comprise further subsystems, including client-side subsystems and server-side subsystems. The client-side subsystem may interface with the home sharing insurance device 212 for each homeowner or user, mobile device 220 for each homeowner or user, and/or the plurality of connected home sensors 220, whereas the server-side subsystem may interface with application servers and computing devices which handle a variety of tasks related to determining insurance premiums and/or deductibles for home sharing insurance and for identifying and compensating for renter-related damages.

The subsystems, application servers, and computing devices of the home sharing insurance subsystem 203 may also have access to the plurality of databases 206. In some embodiments, the plurality of databases 206 may be incorporated into the home sharing insurance subsystem 203 or may be separate components in the home sharing insurance subsystem 203. As an example, the plurality of databases 206 (e.g., databases 206a-206n) may comprise an inventory of insured items for a plurality of homeowners (e.g., including a plurality of photos for each insured item in each insured home), monitored data obtained from connected home sensors 210 for each insured home, insurance factor information for the plurality of homeowners, insurance policy and claims data for the plurality of homeowners, accounts and billing information for the plurality of homeowners, and the like. In some cases, a database 206 may comprise a computer internal to an insurance company that contains customer policy information. A database 206 may also contain policy information for a plurality of homeowners, including but not limited to, each homeowner's relevant coverage limits/deductibles with insurance carriers, each homeowner's address information and other personal information, and any other information apparent to one skilled in the art.

For example, the databases may store insurance information regarding insurance policies of insured homeowners, such as data regarding an account holder, insured individuals, an insurance policy number, insurance coverage, premiums, deductibles, billing information, payment history, address/location information, and the like. The database may include information regarding previous insurance claims for damage, as well as predefined rules for processing insurance claims, different types of insurance coverage, and the like.

The data stored in the plurality of databases 206 may be collected and compiled by the home sharing insurance device 212, the mobile device 220, the plurality of connected home sensors 210, the home sharing insurance subsystem 203, or by servers and subsystems within the home sharing insurance subsystem 203. In another example, one or more databases 206 may also include predefined rules and other information to enable the methods disclosed herein. For example, one or more databases 206 may contain historical claim data, or other applicable data archived by the insurance company (e.g., historical images of items damaged from previous renter-related damage, damage/severity, etc.). This data may be used, among other things, to optimize the rules and/or techniques used in the method and systems disclosed herein.

By utilizing the features described herein, the home sharing insurance system 202 may provide enhanced insurance coverage for homeowners renting out their homes, as well as customized pricing for insuring homes during rental periods. As an example, Table 1 below provides an example of a pricing structure generated by the home sharing insurance system 202 for insuring condominiums and homes that may be rented out to tenants. In Table 1, the Residence Class column may represent the type of insured homeowner renting out a home, as well as the number of tenants for a home rental. A % and B % may represent example percentages for primary or secondary homes or homeowners, and X %, Y %, and Z % may represent example percentages which increase in ascending order depending on the number of weeks that a home is rented out to one or more tenants (e.g., X<Y<Z). For example, a home that is rented out for 51+ weeks may have a higher percentage (e.g., a higher insurance premium value) than a home that is rented out for one or two weeks or months.

TABLE 1

Pricing structure for insuring rented out homes.

| Residence Class | Number of Weeks Rented | | | | |
|---|---|---|---|---|---|
| | 0 | 8-Jan | 25-Sep Rate % | 26-50 | 51+ |
| Primary | Base | N/A | N/A | N/A | N/A |
| Primary, Owns Secondary | -A % | N/A | N/A | N/A | N/A |
| Secondary | -B % | N/A | N/A | N/A | N/A |
| Secondary - Seasonal | -B % | N/A | N/A | N/A | N/A |
| Rented - Portion of Primary Residence to Same Tenant | N/A | X % | X % | Y % | Z % |
| Rented - Portion of Primary Residence to Multiple Tenants | N/A | X % | X % | Y % | Z % |
| Rented - Total Primary Residence to Same Tenant | N/A | X % | X % | N/A | N/A |
| Rented - Total Primary Residence to Multiple Tenants | N/A | X % | X % | N/A | N/A |
| Rented - Portion of Secondary Residence to Same Tenant | N/A | X % | X % | Y % | Z % |
| Rented - Portion of Secondary Residence to Multiple Tenants | N/A | X % | X % | Y % | Z % |
| Rented - Total Secondary Residence to Same Tenant | N/A | X % | X % | Y % | Z % |
| Rented - Total Secondary Residence to Multiple Tenants | N/A | X % | X % | Y % | Z % |

Figure 3:
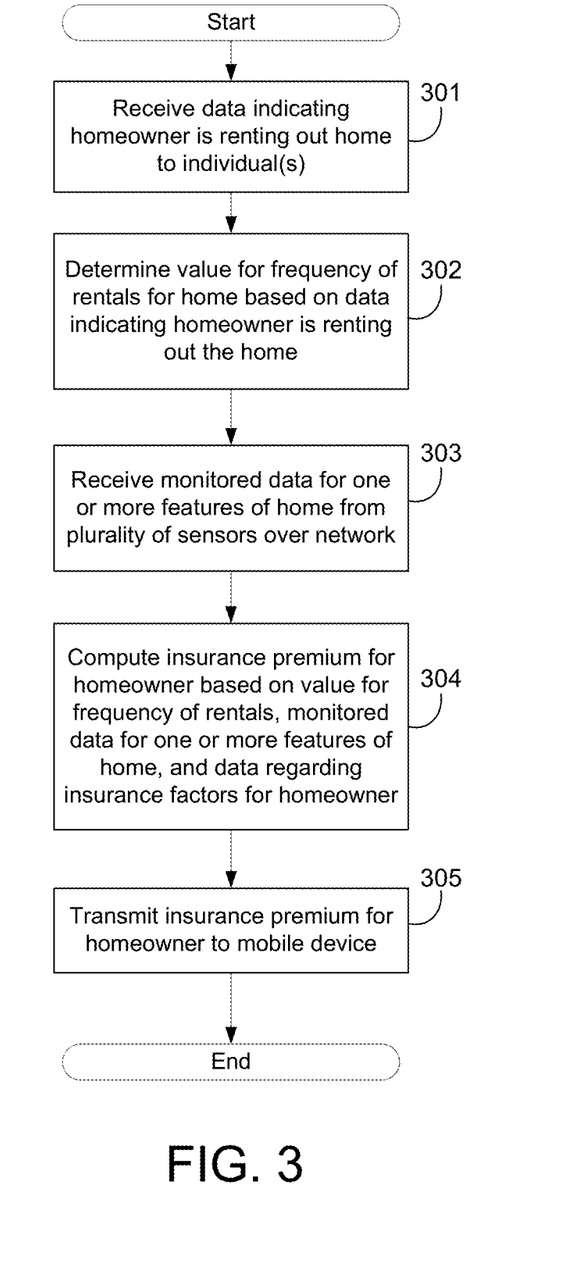
FIG. 3 depicts a flow diagram of example method steps in accordance with one or more example embodiments.

FIG. 3 illustrates a flow diagram of an example method in accordance with aspects of the present disclosure. The steps of FIG. 3 may be performed by subsystems, application servers, and computing devices of the home sharing insurance system 202 (e.g., home sharing insurance subsystem 203). One or more of the steps of FIG. 3 may be performed by executing a home sharing insurance program (e.g., a home sharing insurance mobile application) and/or by operating a particularly configured computing device of the home sharing insurance system 202.

The method of FIG. 3 may begin with step 301, at which the insurance system may receive data indicating that a homeowner is renting out a home to one or more individuals. For example, the home sharing insurance system 202 may receive data indicating that the homeowner is renting out his or her home from a mobile device 220 or a home sharing insurance device 212. In some cases, the data indicating that the homeowner is renting out the home to one or more individuals may comprise a notification or documentation from the homeowner for a rental period for which the one or more individuals are renting the home. At step 302, the system may determine a value for frequency of rentals for the home based on the data indicating that the homeowner is renting out the home. For example, the home sharing insurance system 202 may collect documentation from the mobile device 220 or home sharing insurance device 212 for each time the home is rented out by the homeowner over a period of time. The home sharing insurance system 202 may then determine a value for the frequency of rentals by calculating the number of rentals for the home on a weekly, monthly, or yearly basis.

At step 303, the system may receive monitored data for one or more features of the home from a plurality of sensors over the network. For example, the home sharing insurance system 202 may receive monitored data from a plurality of connected home sensors 210, in which the connected home sensors 210 may be configured to monitor one or more features of the home. The connected home sensors 210 may include at least one of motion sensors, water heater sensors, power sensors, moisture sensors, temperature sensors, window sensors, sump pump sensors, heat or smoking sensing devices, presence sensors, and the like, and the one or more features may include insured items (e.g., appliances, devices, and the like) of the home and/or may represent personal property of the homeowner. The monitored data from the plurality of connected home sensors 210 may indicate whether devices in the home are operating within an expected range or, if it is outside of an expected range or threshold, whether damage has occurred to one or more devices.

At step 304, the system may compute an insurance premium for the homeowner based on the value for the frequency of rentals, monitored data for one or more features of the home, and data regarding insurance factors for the homeowner. For example, the calculation module 205 in the home sharing insurance system 202 may calculate the insurance premium for the homeowner based on varying weights for the value for the frequency of rentals, monitored data for the one or more features of the home, and data regarding insurance factors for the homeowner by applying one or more algorithms. In some cases, the home sharing insurance system 202 may access one or more databases 206 and parse insurance factor information in the one or more databases 206 to obtain a subset of information that is relevant to a particular homeowner. For example, the insurance factor information may include data regarding age, gender and number of years the homeowner has owned the home, credit history, condition, materials and age of the home, location of the home, and the like. At step 305, the system may transmit the insurance premium to the homeowner. For example, the home sharing insurance system 202 may transmit a notification regarding the insurance premium pricing and costs to the mobile device 220 or the home sharing insurance device 212.

Figure 4:
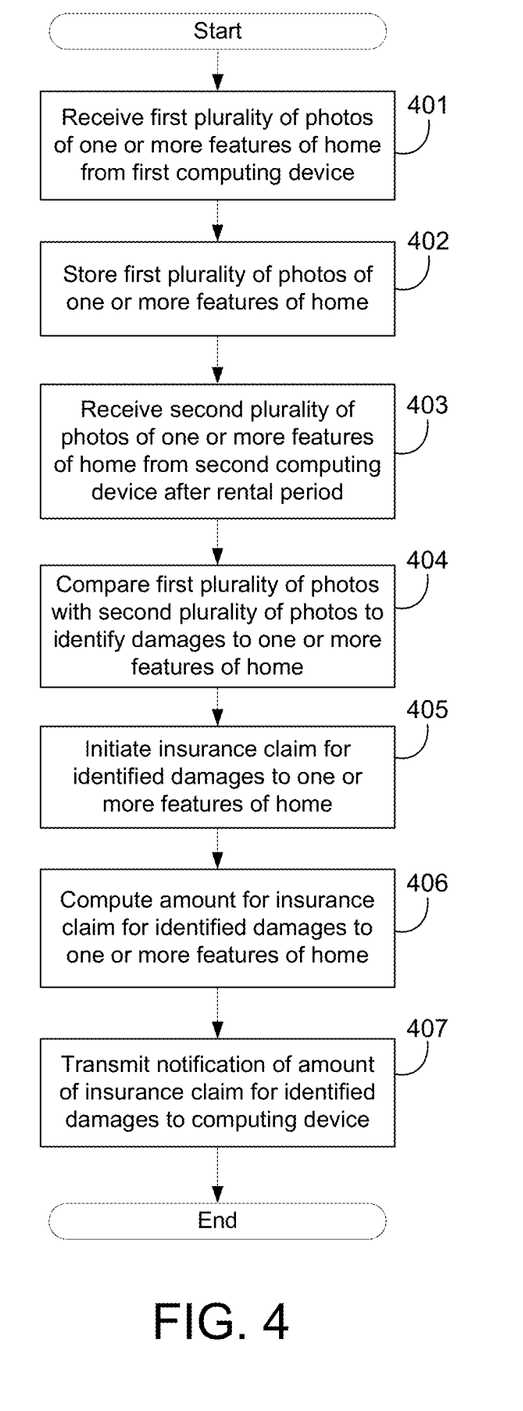
FIG. 4 depicts a flow diagram of example method steps in accordance with one or more example embodiments.

FIG. 4 illustrates a flow diagram of an example method in accordance with aspects of the present disclosure. The steps of FIG. 4 may be performed by subsystems, application servers, and computing devices of the home sharing insurance system 202 (e.g., home sharing insurance subsystem 203). One or more of the steps of FIG. 4 may be performed by executing a home sharing insurance program (e.g., a home sharing insurance mobile application) and/or by operating a particularly configured computing device of the home sharing insurance system 202. In some embodiments, one or more of the steps of FIG. 4 may be performed after the steps of FIG. 3.

The method of FIG. 4 may begin with step 401, at which the insurance system may receive a first plurality of photos of one or more features of a home from a computing device. For example, the home sharing insurance system 202 may receive the first plurality of photos of the insured items from a mobile device 220 or a home sharing insurance device 212. In some cases, the first plurality of photos may be captured by the homeowner on a camera on the mobile device 220 or on the home sharing insurance device 212 (e.g., using sensors 225 or 215). The captured photos may be transmitted from the mobile device 220 or from the home sharing insurance device 212 to the home sharing insurance system 202. At step 402, the insurance system may store the first plurality of photos of the one or more features of the home. For example, the home sharing insurance system 202 may store the first plurality of photos of the one or more features of the home in a memory of a computing device associated with the home sharing insurance system subsystem 203. In another example, the home sharing insurance system 202 may store the first plurality of photos of the one or more features of the home in one or more databases 206, in which the databases 206 may be referred to as a "digital repository."

At step 403, the insurance system may receive a second plurality of photos of one or more features of the home from a second computing device after a rental period has occurred or after a predetermined period of time has expired. For example, the home sharing insurance system 202 may receive the second plurality of photos of the insured items from the mobile device 220 or the home sharing insurance device 212 after the homeowner has rented out his or her home to one or more individuals during a rental period. In some embodiments, the second plurality of photos may be captured using a mobile device 220 and/or home sharing insurance device 212 of the homeowner or of an employee of a cleaning service, in which the cleaning service may be hired by the homeowner to clean and maintain the property for future rentals.

At step 404, the insurance system may compare the first plurality of photos with the second plurality of photos to identify damages to one or more features of the home. For example, the home sharing insurance system 202 may access the first plurality of photos stored in the one or more databases 206 (e.g., the digital repository) and compare the first plurality of photos depicting the insured items prior to rental with the second plurality of photos depicting the insured items after rental. The home sharing insurance system 202 may utilize one or more digital image processing algorithms and image analysis algorithms to detect differences between the photos depicting the items and to identify any damages. In some embodiments, the calculation module 205 and/or the inventory module 207 may be utilized to apply the one or more digital image processing algorithms (e.g., discrete cosign transform algorithms, Fourier transform algorithms, or the like) to the photos and perform image analysis of the photos, including at least one of image compression, filtering, image selection, image segmentation, thresholding, pixilation, or the like. Based on the image analysis, the home sharing insurance system 202 may identify any damages to the one or more items of the home. In some embodiments, the home sharing insurance system 202 may identify one or more damaged portions in the photos and may crop or otherwise modify the photos such that only the one or more damaged portions of the photos are saved, transmitted, and/or used for processing insurance claims. By saving and/or utilizing just the portions of the photos that depict the damages, the home sharing insurance system 202 may be able to save storage space as needed for storing the photos.

At step 405, the insurance system may initiate an insurance claim for identified damages to the one or more features of the home. For example, the home sharing insurance system 202 may initiate an insurance claim for the homeowner based on identifying what type of damage has occurred, based on the severity of the damage, and based on determining how much of the damage the homeowner's insurance policy will cover. In some cases, there may be a limit to the amount of money provided to homeowners for covering renter-related damages in the home, but the home sharing insurance system 202 may adjust the limit according to the value of items in the home or according to the homeowner's selections and/or preferences in his or her home insurance policy. At step 406, the insurance system may compute an amount for the insurance claim for the identified damages to the one or more features of the home. For example, the calculation module 205 in the home sharing insurance system 202 may calculate an amount for the insurance claim based on the type of damage and the severity of the damage. In some embodiments, the home sharing insurance system 202 may receive additional information associated with the severity of damage from one or more sensors of the connected home sensors 210. For example, the connected home sensors 210 may be monitoring devices in the home and collecting data in real-time or near real-time. The connected home sensors 210 may transmit data to the home sharing insurance system 202, in which the transmitted data may aid in determining the severity of damage to one or more items in the home. For example, if the home sharing insurance system 202 receives data from the connected home sensors 210 indicating that a window has been broken (e.g., from a breakage sensor monitoring one or more windows in the home), a moisture sensor in the room with the broken window may provide additional data indicating whether any water damage has occurred due to the broken window (e.g., from rain, snow, etc.). In some cases, this additional information indicating that there is also moisture present in addition to the window being broken may aid in indicating a severity of the damage and in determining an amount for the insurance claim to cover the cost of the repair of the damage.

At step 407, the insurance system may transmit a notification of the amount of the insurance claim for the identified damages to the computing device. For example, the home sharing insurance system 202 may transmit a notification regarding the initiated insurance claim and the amount for covering the damages to the mobile device 220 or the home sharing insurance device 212.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
   one or more databases storing data regarding insurance factors associated with a home;
   a plurality of sensors configured to monitor one or more features of the home;
   a network; and
   a server, comprising hardware including one or more processors and memory, the server configured to:
   receive, from a device associated with an owner of the home, over the network, data indicating that the owner is renting out the home for a first amount of time;
   determine, by the one or more processors, based on the data indicating that the owner is renting out the home for the first amount of time, a total amount of rental time for the home in a particular period, wherein the total amount of rental time is greater than the first amount of time;

receive, from the plurality of sensors and over the network, monitored data for one or more features of the home;

compute, by the one or more processors, an insurance premium for the owner based on the total amount of rental time for the home in the particular period, the monitored data for the one or more features of the home, and the data regarding the insurance factors associated with the home; and transmit the insurance premium for the owner to the device.

2. The system of claim 1, further comprising:

a first computing device and a second computing device each configured to capture a first plurality of photos and a second plurality of photos, respectively, of the one or more features of the home;

wherein the server is further configured to:

receive, from the first computing device, the first plurality of photos of the one or more features of the home;

store the first plurality of photos of the one or more features of the home in the memory;

receive, from the second computing device, the second plurality of photos of the one or more features of the home after a rental has occurred, wherein the first plurality of photos and the second plurality of photos are different;

compare, by the one or more processors, the first plurality of photos stored in the memory with the second plurality of photos to identify damages to the one or more features of the home;

initiate, by the one or more processors, an insurance claim for the identified damages to the one or more features of the home;

compute, by the one or more processors, an amount for the insurance claim for the identified damages to the one or more features of the home; and transmit, by the one or more processors and to the device associated with the owner, a notification of the amount for the insurance claim for the identified damages to the one or more features of the home.

3. The system of claim 2, wherein the server is further configured to:

perform, by the one or more processors, image analysis of the first plurality of photos and the second plurality of photos using one or more image analysis algorithms.

4. The system of claim 1, wherein the one or more databases further store data regarding the one or more features of the home, wherein the one or more features of the home comprise insured items of the home and represent personal property of the owner.

5. The system of claim 1, wherein the data regarding the insurance factors associated with the home comprise data regarding age, gender and number of years the owner has owned the home, credit history, condition, materials and age of the home, and location of the home.

6. The system of claim 1, wherein the plurality of sensors comprise at least one of motion sensors, water heater sensors, power sensors, moisture sensors, temperature sensors, window sensors, sump pump sensors, heat or smoking sensing devices, and presence sensors.

7. The system of claim 1, wherein the total amount of rental time for the home in the particular period indicates a number of weeks the home is rented in a year, wherein the home is insured by an insurance provider, and wherein the owner is an insurance policy holder.

8. The system of claim 1, wherein the monitored data comprises at least one of metrics, levels, and values indicating performance and quality of the one or more features of the home.

9. The system of claim 1, wherein the data indicating that the owner is renting out the home to one or more individuals comprises a notification or documentation from the owner for a rental period for which the one or more individuals are renting the home.

10. An apparatus comprising:

at least one processor;

a network interface configured to communicate, via a network, with one or more computing devices; and a memory storing computer-readable instructions that, when executed by the at least one processor, cause the apparatus to:

receive, from a device associated with an owner of a home, data indicating that the owner is renting out the home for a first amount of time;

determine, by the one or more computing devices, based on the data indicating that the owner is renting out the home for the first amount of time, a total amount of rental time for the home in a particular period, wherein the total amount of rental time is greater than the first amount of time;

receive monitored data for one or more features of the home from a plurality of sensors in the home;

compute, by the one or more computing devices, an insurance premium for the owner based on the total amount of rental time for the home in the particular period, the monitored data for the one or more features of the home, and data regarding insurance factors associated with the home; and transmit the insurance premium for the owner to the device.

11. The apparatus of claim 10, wherein the instructions, when executed by the at least one processor, further cause the apparatus to:

receive, from a first computing device, a first plurality of photos of the one or more features of the home;

receive, from a second computing device, a second plurality of photos of the one or more features of the home after a rental has occurred, wherein the first plurality of photos and the second plurality of photos are different;

compare, by the at least one processor, the first plurality of photos with the second plurality of photos to identify damages to the one or more features of the home;

initiate, by the at least one processor, an insurance claim for the identified damages to the one or more features of the home;

compute, by the at least one processor, an amount for the insurance claim for the identified damages to the one or more features of the home; and transmit, by the at least one processor and to the device associated with the owner, a notification of the amount for the insurance claim for the identified damages to the one or more features of the home.

12. The apparatus of claim 10, wherein the one or more features of the home comprise insured items of the home and represent personal property of the owner.

13. The apparatus of claim 10, wherein the data regarding the insurance factors associated with the home comprise data regarding age, gender and number of years the owner has owned the home, credit history, condition, materials and age of the home, and location of the home.

14. The apparatus of claim 10, wherein the plurality of sensors comprise at least one of motion sensors, water heater sensors, power sensors, moisture sensors, temperature sensors, window sensors, sump pump sensors, heat or smoking sensing devices, and presence sensors, and wherein the monitored data comprises at least one of metrics, levels, and values indicating performance and quality of the one or more features of the home.

15. The apparatus of claim 10, wherein the total amount of rental time for the home in the particular period indicates a number of weeks the home is rented in a year, wherein the home is insured by an insurance provider, and wherein the owner is an insurance policy holder.

16. A method comprising:
receiving, from a device and over a network, data indicating that an insured occupant of a residence is renting out a residence for a first amount of time;
determining, by one or more computing devices, based on the data indicating that the insured occupant is renting out the residence for the first amount of time, a total amount of rental time for the residence in a particular period, wherein the total amount of rental time is greater than the first amount of time;
receiving, from a plurality of sensors in the residence, monitored data for one or more features of the residence, wherein the one or more features of the residence comprise insured items of the residence and represent personal property of the insured occupant;
computing, by the one or more computing devices, an insurance premium for the insured occupant based on the total amount of rental time, the monitored data for the one or more features of the residence, and data regarding insurance factors associated with the residence; and
transmitting, by the one or more computing devices, the insurance premium for the insured occupant to the device.

17. The method of claim 16, further comprising:
receiving, from a first computing device, a first plurality of photos of the one or more features of the residence;
receiving, from a second computing device, a second plurality of photos of the one or more features of the residence after a rental has occurred, wherein the first plurality of photos and the second plurality of photos are different;
comparing, by at least one processor of the one or more computing devices, the first plurality of photos with the second plurality of photos to identify damages to the one or more features of the residence;
initiating, by the at least one processor, an insurance claim for the identified damages to the one or more features of the residence;
computing, by the at least one processor, an amount for the insurance claim for the identified damages to the one or more features of the residence; and
transmitting, by the at least one processor and to the device, a notification of the amount for the insurance claim for the identified damages to the one or more features of the residence.

18. The method of claim 16, wherein the data regarding the insurance factors associated with the residence comprise data regarding age, gender and number of years the insured occupant has owned the residence, credit history, condition, materials and age of the residence, and location of the residence.

19. The method of claim 16, wherein the plurality of sensors comprise at least one of motion sensors, water heater sensors, power sensors, moisture sensors, temperature sensors, window sensors, sump pump sensors, heat or smoking sensing devices, and presence sensors, and wherein the monitored data comprises at least one of metrics, levels, and values indicating performance and quality of the one or more features of the residence.

20. The method of claim 16, wherein the total amount of rental time for the residence in the particular period indicates a number of weeks the residence is rented in a year, wherein the residence is insured by an insurance provider, and wherein the insured occupant is an insurance policy holder.

* * * * *

UNITED STATES PATENT AND TRADEMARK OFFICE
CERTIFICATE OF CORRECTION

| | | |
|---|---|---|
| PATENT NO. | : 10,726,492 B2 | Page 1 of 1 |
| APPLICATION NO. | : 15/237197 | |
| DATED | : July 28, 2020 | |
| INVENTOR(S) | : Snyder et al. | |

It is certified that error appears in the above-identified patent and that said Letters Patent is hereby corrected as shown below:

In the Specification

Column 14, Line 6:
Delete "220," and insert --210,--

Column 17, Line 6:
After "insurance", delete "system"

In the Claims

Column 21, Line 15:
In Claim 16, delete "out a residence" and insert --out the residence--

Signed and Sealed this
Fifteenth Day of December, 2020

Andrei Iancu
*Director of the United States Patent and Trademark Office*